United States Patent [19]

Welch et al.

[11] Patent Number: 4,875,880

[45] Date of Patent: Oct. 24, 1989

[54] MODULAR FACEPLATE SYSTEM

[75] Inventors: Glenn S. Welch, Lynnfield; Stephen Fidrych, Boxboro; Michael Romm, Brighton; Bernie J. Maurer, Melrose, all of Mass.

[73] Assignee: Digital Equipment Corporation, Maynard, Mass.

[21] Appl. No.: 222,500

[22] Filed: Jul. 21, 1988

[51] Int. Cl.⁴ ............................................. H01R 13/60
[52] U.S. Cl. ....................................... 439/536; 439/557
[58] Field of Search ................... 248/27.3; 174/55, 66; 439/533, 536, 553, 576; 220/3, 8

[56] References Cited

U.S. PATENT DOCUMENTS

| | | | |
|---|---|---|---|
| 2,160,713 | 5/1939 | Bentley | 439/544 X |
| 4,046,449 | 9/1977 | Ranzanigo | 439/553 |
| 4,647,725 | 3/1987 | Dellinger et al. | 439/544 X |
| 4,717,358 | 1/1988 | Chaundy | 439/557 |

Primary Examiner—Eugene F. Desmond
Attorney, Agent, or Firm—Kenyon & Kenyon

[57] ABSTRACT

A modular faceplate system having four levels of modularity includes a standard faceplate, a plurality of secondary support members, and a plurality of modules. The faceplate may be secured to a variety of support structures such as an outlet box, a modular box and a wall box. The faceplate has an elongated opening formed therein for the secondary support members. The secondary support members support the various different modules in various configurations. The modules can support a variety of electrical devices including plugs and electrical connectors. The faceplate, secondary support members and modules all include snap-type fastening means such that a desired faceplate configuration can be assembled from the component parts without the use of hardware.

16 Claims, 4 Drawing Sheets

Fig. 1
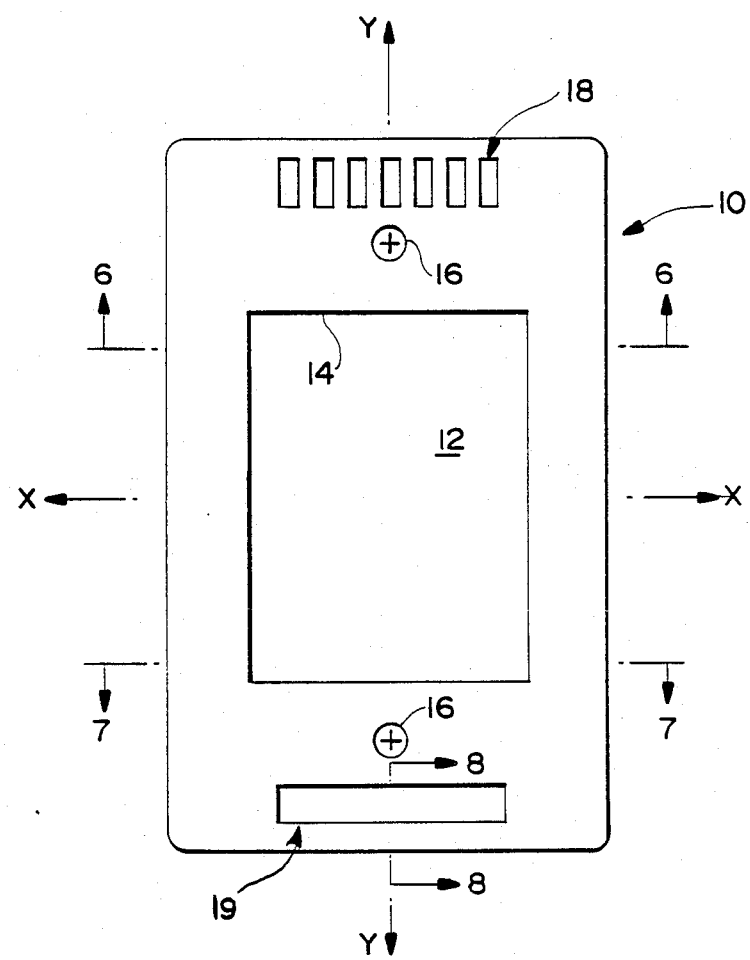
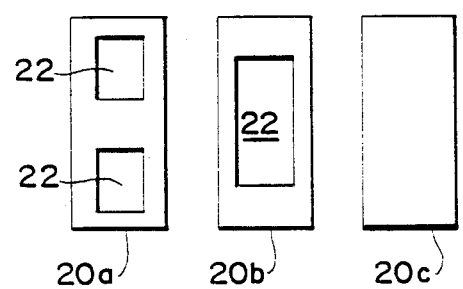
Fig. 3A  Fig. 3B  Fig. 3C

MODULAR FACEPLATE SYSTEM

BACKGROUND OF THE INVENTION

The present invention relates to a modular faceplate system for supporting different electrical plugs and/or connectors in various configurations.

Conventional faceplates are used to support electrical components such as telephone plugs, electrical connectors, light switches, and electrical outlets. Additionally, faceplates are used in the complex office interconnect systems which the computer industry has recently begun pioneering. These systems include a variety of interconnects at a multitude of locations which are typically supported by faceplates. Various faceplate configurations are needed in order to support the electrical elements in different configurations.

Of course, it is possible to provide a different faceplate for each desired configuration of electrical components. However, this approach is both inflexible and inefficient since it fails to take advantage of the economies available by using standardized parts.

Another known approach is a modular faceplate design in which a standard faceplate is designed to receive a plurality of modules. Typically, the modules are of identical size and can support or have formed therein various plugs and electrical connectors. Such systems also provide blank modules (i.e., modules having no holes or components formed therein) designed to fill the module space when it is desired that no plug or connector be located in that particular space.

Conventional faceplates provide, at best, three levels of modularity. Specifically, it is known to provide a level of modularity between the faceplate and its supporting structure by designing the faceplate for accommodating conventional hardware, typically screws, which are dimensioned such that the faceplate can be supported on an outlet box, a modular box, or a wall bracket. Further, in faceplate designs such as the MOD-TAP (discussed below), there is a level of modularity between the faceplate and the modules such that the faceplate is adapted to receive a variety of different, but similarly dimensioned, modules which may have a variety of plugs formed therein or electrical connectors mounted therein. Finally, there is a level of modularity between those modules which are adapted to support a variety of electrical connectors and the various electrical connectors thus supported.

One known modular faceplate system is commercially available under the trademark MOD-TAP. In this system, the faceplate is designed to support four modules. The modules may be blank modules or may have a plug and/or electrical connector formed therein.

Another example of a modular faceplate system is disclosed in U.S. patent application Ser. No. 923,076 filed Oct. 24, 1986 and assigned to the assignee of the present invention. This application discloses the design of a faceplate which supports a plurality of modules having plugs formed therein and includes openings for supporting electrical connectors.

Known modular faceplate systems offer a limited degree of standardization and, to some extent, the efficiencies and flexibilities resulting from standardization. However, the level of modularity and hence standardization provided by known systems is limited. Specifically, in known systems, there is only one level of modularity between the faceplate and the modules located therein. For instance, in the MOD-TAP system the faceplate can only support modules of a specific size and the components supported can only be oriented in one direction and configuration. Similarly, in the design illustrated in U.S. application Ser. No. 923,076, the faceplate can only receive modules of one type, configuration and orientation.

Another problem with known systems such as the MOD-TAP is that the faceplate does not include integral means for securing the modules thereto. In the MOD-TAP system, an additional locking bracket must be mounted to the back of the faceplate to lock the modules into position.

SUMMARY OF THE INVENTION

The modular faceplate system of the present invention offers greatly increased flexibility and efficiency by providing an additional level of modularity. Further, the faceplate system of the present invention obviates the need for a separate locking bracket or similar means by providing integral fastening means.

The present invention differs from those conventional faceplate designs which provide no more than three levels of modularity by providing a fourth level of modularity. Specifically, the present invention provides two levels of modularity between the faceplate and the modules, a level of modularity between the faceplate and its supporting structure, and a level of modularity between the modules and the electrical device (e.g., plug or connector) supported therein. The additional level of modularity is achieved through the use of secondary supporting members interchangeably mounted in the faceplate and adapted to support the modules. Because of the additional level of modularity, it is possible to assemble a variety of modular receiving configurations while utilizing a standard faceplate design. For example, when the faceplate is designed to receive two secondary supporting members and there are four different designs of secondary members, the five standard components (faceplate and four secondary members) can be configured in as many as sixteen different ways, thus replacing sixteen different non-standard faceplate designs.

The use of secondary supporting members also allows the faceplate system to accommodate modules of differing sizes when and where desired. Specifically, the standard faceplate of the system can support secondary supporting members having a standard outer configuration and an interior support configuration dimensioned to support a wide variety of components.

Further, integral fastening means are provided on each of the components of the faceplate system of the present invention. Thus, the components can be secured to one another without the use of separate hardware. In accordance with a preferred embodiment of the present invention, snap-type fastening means are employed.

Thus, the modular faceplate system of the present invention provides two levels of modularity between the support module and the faceplate, is capable of accommodating various sizes of modules, and provides snap lock means for connecting the various components of the faceplate system to one another without the use of separate hardware.

BRIEF DESCRIPTION OF THE DRAWINGS

FIG. 1 is a front view of the faceplate component of the modular faceplate system of the present invention.

FIGS. 3A-3C are schematic representations illustrating possible configurations of the secondary supporting members of the faceplate system of the present invention.

DETAILED DESCRIPTION OF THE PREFERRED EMBODIMENT

Figure 2:
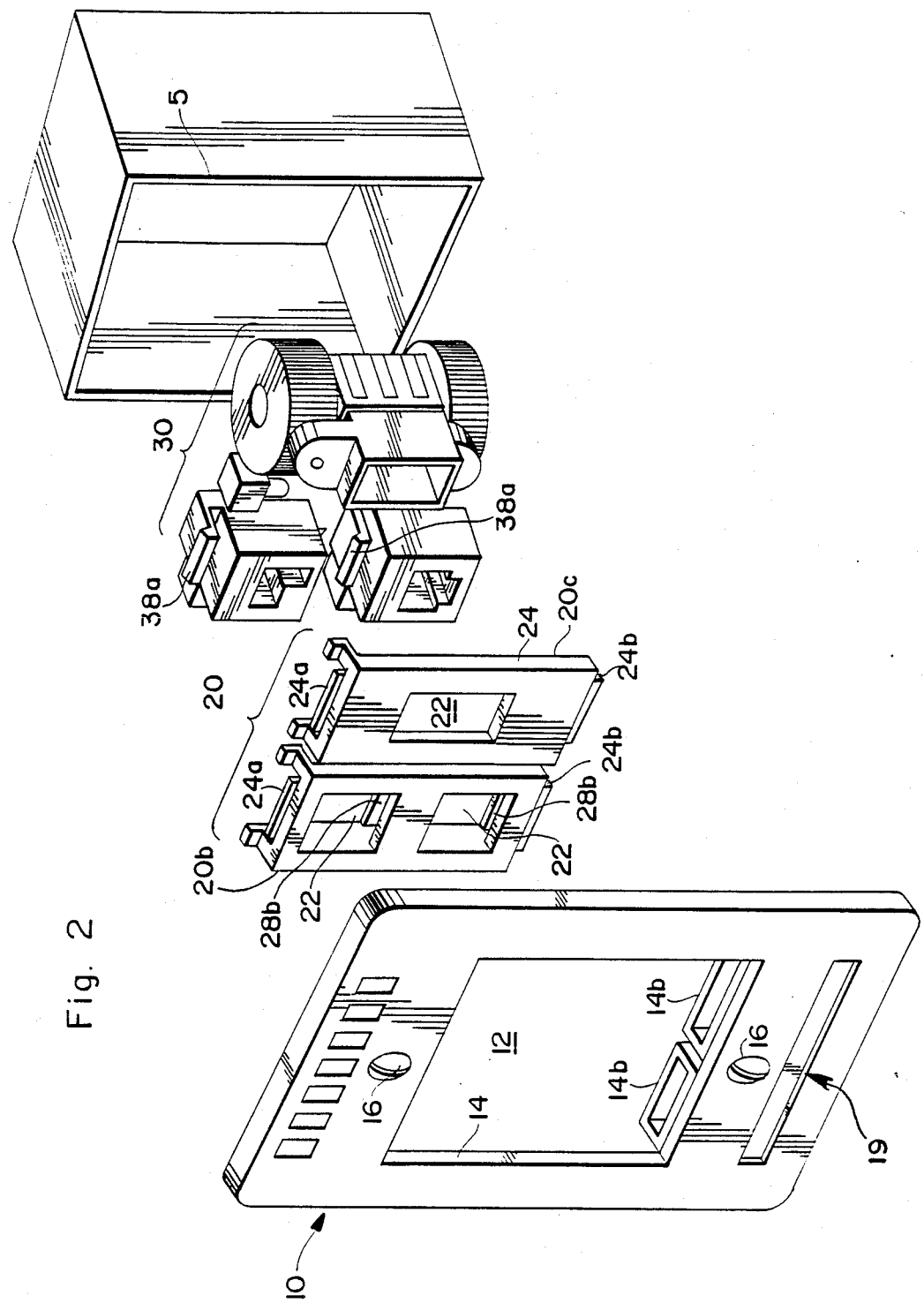
FIG. 2 is an exploded perspective view of one assembly of the modular faceplate system of the present invention.

FIG. 1 shows a front view of the standard faceplate component 10 of the faceplate system of the present invention. As shown in FIG. 1, the faceplate 10 is generally rectangular in shape and includes a generally rectangular opening 12 formed therein. The perimeter of the opening 12 defines a primary frame 14, the function of which will be discussed below. The faceplate 10 also includes fastener receiving means such as a pair of fastener openings 16 for receiving conventional fastening means such as screws or the like for securing the faceplate 10 to a supporting structure such as an outlet box, a modular box or a wall bracket (not shown).

To the extent described above, the faceplate 10 is preferably symmetrical about both its x axis and its y axis as shown in FIG. 1. The symmetrical disposition of the opening 12, fastener receiving means 16 and primary frame 14 allows the faceplate to be mounted on the faceplate supporting structure (not shown) regardless of its vertical orientation. Accordingly, the orientation of the modules supported in the secondary support structures can be changed by simply reorienting the faceplate, i.e. turning the faceplate upside down (as viewed in FIG. 1). This is particularly advantageous when the primary frame 14 supports a plurality of dissimilar secondary support elements.

In some instances, it may be undesirable to reposition the modules in this manner. Specifically, it may be desirable, for purely commercial reasons, to provide identifying information 18 such as a corporate name or logo at one end of the faceplate 10. Moreover, it is often desirable to provide a slot 19 for retaining a removable label or the like. In such instances, reorienting the faceplate to rearrange the modules, is less desirable since it is obviously not desirable to orient the identifying information 19 upside down. Nevertheless, the orientation of the identifying information 18 obviously has no effect on the function of the faceplate 10.

FIG. 2 is an exploded perspective view of one faceplate assembly which can be assembled in accordance with the present invention. The assembly includes the standard faceplate component 10, a plurality of secondary support members or components 20, a plurality of modules 30 and an outlet box 5. Preferably, the faceplate 10, secondary support members 20, and modules 30 are constructed of plastic.

As noted above, the standard faceplate 10 includes rectangular opening 12, primary frame 14 and fastener opening 16. Additionally, the frame 14 includes an integral fastening means, which in the illustrated embodiment comprises a plurality of grooved protrusions 14a (not shown) and a plurality of slotted protrusions 14b.

The different secondary support members 20 have formed therein different secondary frame support structures including those illustrated in FIG. 3. However, the exterior configuration of each of the secondary support members is identical. Thus, the secondary support members are, in a sense, modules. In the illustrated embodiment, the support members each include a rectangular outer edge 24. The secondary support members are dimensioned such that when a plurality of second support members equal in number to the number of support members for which the faceplate is adapted to support (two in the illustrated embodiment) are set side by side, the rectangular opening 12 is substantially occupied by the secondary support members. Thus, in the illustrated embodiment, where the faceplate is designed to hold two secondary support members, the two support members 20 are interchangeably supported by the primary frame 14 along the outer edge 24 of the support members.

In the illustrated embodiment, the faceplate is shown as being designed to interchangeably support two secondary support members. It is possible to design a faceplate to support more members simply by appropriately dimensioning the rectangular opening and secondary support members and providing additional fastening means such as the slotted projections 14b and groove projections 14a. Further, in the illustrated embodiment, the projections 14a and 14b are formed on the horizontally extending edges of the frame 14, it is equally possible to provide these elements along the vertical edges of the frame 14 such that the secondary support members extend horizontally across the rectangular opening 12.

Each secondary support member includes integrally formed fastening means which are complementary to the integrally formed fastening means of the faceplate. The fastening means allows the secondary support members to be interchangeably supported on the faceplate. In the illustrated embodiment, each secondary member includes a tapered protrusion 24a which is complementary with the groove 14a of the frame 14 of the faceplate 10 and a flexible tongue element 24b which is complementary with the slotted protrusion 14b of the faceplate 10. The provision of the fastening means shown in FIG. 2 allows the secondary support members to be snapped securely and releasably into place in the manner which is well known with such fastening means. While the illustrated fastening means are non-symmetrical (i.e., dissimilar means are used on the ends of the frame and support members), it is possible to provide symmetrical fastening means such that the secondary support members can be mounted in the frame regardless of orientation.

The secondary support members 20 may include one or more secondary support frame openings or they may be blank (i.e., have no secondary support frames). As illustrated in FIG. 2, each secondary support frame 22 has a configuration (see FIG. 3) particularly suited for interchangeably supporting a single module which may have various configurations including those illustrated in FIG. 4. The modules 30 may include integral fastening means such as snap type locking devices 38a and 38b (not shown) which are received in complementary grooves 28a and slots 28b integrally formed in the secondary support members in a manner similar to the fastening arrangement used to interchangeably secure the secondary members in the faceplate 10. Of course, similar well known snap type means for securing the secondary members 20 into the faceplate 10 and the modules 30 into the secondary members 20 may be employed.

Figure 5:
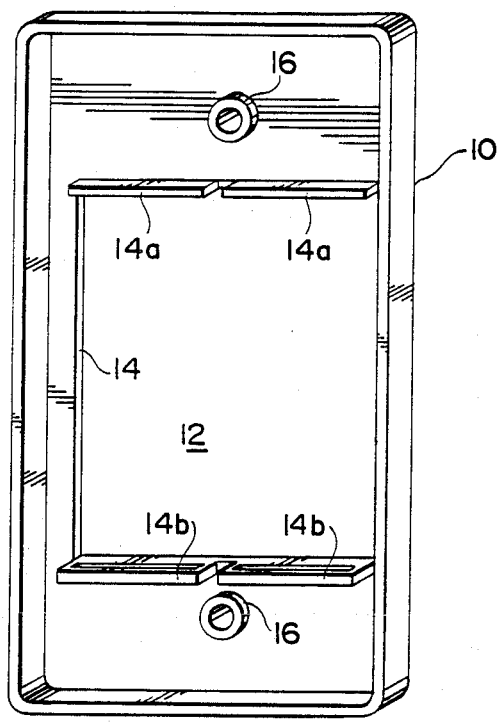
FIG. 5 is a rear perspective view of the faceplate component of the modular faceplate system of the present invention.

FIG. 5 illustrates a rear perspective view of the faceplate of the present invention. This perspective view offers a particularly good view of the slotted projections 14b and the grooved projections 14a of the support frame 14.

FIGS. 3(A)-3(C) illustrate four possible configurations for the secondary support members. The support member 20a shown in FIG. 3(A) includes a pair of rectangular slots 22 for receiving a first type of module. The support member 20b shown in FIG. 3(B) includes one elongated rectangular opening 22. The support member 20c shown in FIG. 3(C) is a blank support member (i.e., a support member having no openings) used partially to fill the rectangular opening 12 in the faceplate 10 when it is not desired to support any members in a particular portion of the rectangular opening 12.

Although not illustrated, other support structures are possible. For instance, it is possible to provide a support structure having narrower openings than those shown in FIG. 3(A) or openings of different sizes. Additionally, it is possible to reorient the openings shown in FIGS. 3(A) and it is also possible to include a single opening of the type shown in either FIG. 3(A). Nevertheless, the secondary support configurations illustrated in FIGS. 3(A)-3(C) permit assembly of most commonly desired faceplate configurations.

Any combination of standard secondary support members may be interchangeably supported in the primary frame of the faceplate. In the illustrated embodiment, where the faceplate is designed to hold just two secondary support structures, the use of three standard support structure configurations of the type shown in FIG. 3 permits assembly of eight different faceplate designs. Similarly, the use of four standard support structure configurations would permit assembly of sixteen different faceplate designs through the use of the four standard secondary members and one standard faceplate. Further, because of the flexibility of the faceplate design, it is not necessary to reorient the faceplate itself such that when the faceplate includes identifying information 18 such as that shown in FIG. 1, the faceplate can be retained in the orientation shown in FIG. 1 without sacrificing flexibility of design.

The number of possible faceplate configurations is dependent on two factors, the number N of secondary support members supported in the rectangular opening of the standard faceplate and the number S of standard secondary support member configurations. The number of possible faceplate configurations (PFPC) is then:

PFPC=$S^N$

Thus, in the illustrated embodiment where S is equal to three and N is equal to two, the number of possible faceplate configurations is equal to nine.

It should be evident that the additional degree of modularity added through the provision of the secondary support members makes it possible to achieve a wide variety of faceplate configurations through the use of a relatively small number of standard parts. For instance, the prior art would require as many as eight different faceplate configurations to achieve the flexibility offered through the use of four standard parts in the illustrated embodiment. The degree of standardization becomes even greater when the faceplate is designed to support more than two secondary support members. For example, the prior art would require as many as sixteen different faceplate configurations to achieve the flexibility offered through the use of five standard parts.

Figure 4A:
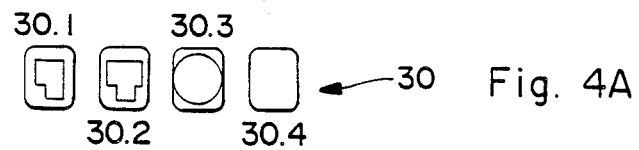
FIGS. 4A-4C are schematic representations illustrating various module configurations in accordance with the present invention.
Figure 4B:
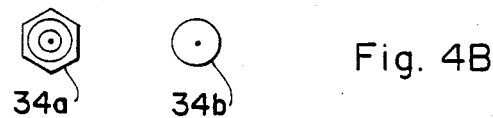
Figure 4C:
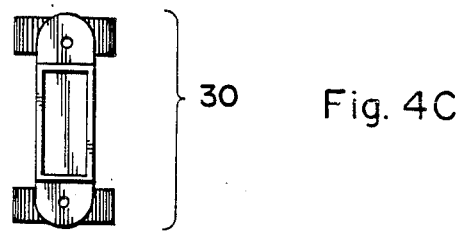
Figure 6:
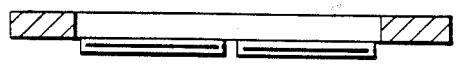
FIG. 6 is a cross-section of the faceplate along the lines indicated in FIG. 1.
Figure 7:
FIG. 7 is a cross-section of the faceplate along the lines indicated in FIG. 1.
Figure 8:
FIG. 8 is a partial cross-section of the faceplate along the lines indicated in FIG. 1.

FIG. 4 illustrates various modules which are adapted to be supported in the secondary support structures illustrated in FIG. 3. Specifically, FIG. 4(A) illustrates modules adapted to be supported in the openings of the support structure 20a shown in FIG. 3(A). FIG. 4(C) illustrates an application specific connector such as, for example, a daisy chain connector which can be supported in the elongated opening 2 of the secondary support structure 20c illustrated in FIG. 3(B). Of course, the opening can be dimensioned to support any particular application specific connector.

Typically, the modules support an electrical device such as a plug or electrical connector. However, blank modules may also be provided. Generally, modules adapted to support plugs have some built in non-plastic electrical components. On the other hand, modules for supporting electrical connectors simply have one or more tertiary frames formed therein and are constructed entirely of plastic or the like.

FIG. 4(B) illustrates various electrical connectors 34a and 34b which can be supported in the module 30.3 illustrated in FIG. 4(A). The ability to support different electrical connectors such as 34a and 34b in a single module 30.3 demonstrates a further level of modularity of the faceplate system of the present invention. Preferably, the electrical connectors 34a and 34b can be secured to the module 30.3 without the use of hardware by, for example, snapping the connectors into place.

As is evident from the foregoing discussion, the modular faceplate system of the present invention provides four levels of modularity. Specifically, there is a level of modularity between the faceplate and its support structure, since the faceplate is adapted to be supported by a variety of structures including an outlet box, a modular box and a wall bracket. There is a further level of modularity between the secondary support members 20 and the faceplate 10 since the faceplate 10 is adapted to support a plurality of secondary support members having different configurations. Further, there is a level of modularity between the secondary support members 20 and the modules 30 since the openings 22 of the secondary support members can support modules 30 having a variety of configurations as illustrated in FIG. 4. Finally, there is a level of modularity within the modules since some of the modules such as the module 30.3 illustrated in FIG. 4A can support a variety of electrical connectors such as those shown in FIG. 4B.

The modules are primarily constructed of plastic. However, the modules can have non-plastic electrical components formed therein.

Because each of the components of the faceplate system can be interchangeably secured to one another by a snap type fastening or other similar fastening, the faceplate of the present invention can be assembled to specifications without the use of hardware.

What is claimed is:

1. A modular faceplate system comprising:

a faceplate having an elongated primary frame opening formed therein;

a plurality of secondary support members interchangeably mounted on said faceplate in said primary frame opening, at least one of said secondary support members having at least one secondary frame opening formed therein;

a plurality of modules, one of said modules supported in each said secondary frame opening and at least one module supporting an electrical device.

2. The modular faceplate system of claim 1, wherein a plurality of the secondary support members include at least one secondary frame opening formed therein.

3. The modular faceplate system of claim 1, wherein at least one of the secondary support members comprises a plurality of secondary frame openings formed therein.

4. The modular faceplate system of claim 2, wherein at least one of the secondary support members has at least two secondary frame openings formed therein.

5. The modular faceplate system of claim 1, further comprising at least one module supported in a secondary frame opening, said module having at least one tertiary frame opening formed therein and an electrical device releasably mounted in said tertiary frame opening.

6. The modular faceplate system of claim 1, further comprising fastening means integrally formed on each said secondary support member and complementary fastening means integrally formed on said faceplate such that the fastening means of the secondary support members directly contact and cooperate with the fastening means of the faceplate to releasably secure the secondary support members to the faceplate.

7. The modular faceplate system of claim 6, further comprising integral fastening means formed on at least one module and complementary fastening means of the module directly contacting and cooperating with the integral fastening means of the secondary frame opening for releasably securing a module within the secondary frame opening.

8. In a modular faceplate system having four levels of modularity;

a faceplate, said faceplate being supportable on a plurality of different support structures, said faceplate having an elongated primary frame opening formed therein;

a plurality of different secondary support members releasably supported in said primary frame opening, at least one of said secondary support members having a secondary frame opening formed therein;

a plurality of different modules interchangeably supportable in said secondary frame opening, at least one said module having a tertiary frame opening formed therein; and a plurality of different electrical devices interchangeably supportable in said tertiary frame opening.

9. The modular faceplate system of claim 8, wherein said elongate frame opening is substantially rectangular and said plurality of secondary support members supported in said primary frame opening substantially occupy said primary frame opening.

10. The modular faceplate system of claim 8, wherein at least one of said secondary support members has a plurality of secondary frame openings formed therein.

11. The modular faceplate system of claim 8, wherein said faceplate has a front surface which is substantially symmetrical about both a horizontal axis and a vertical axis.

12. The modular faceplate system of claim 8, further comprising fastening means formed on each of said secondary support members and complementary fastening means formed on said faceplate, the fastening means of the secondary support members directly contacting and cooperating with the fastening means of the faceplate to releasably secure the secondary support members in the primary frame opening of the faceplate.

13. The modular faceplate system of claim 12, wherein said fastening means of the secondary support members comprise protrusions and the fastening means of the faceplate comprise slots which are complementary to the protrusions of the secondary support members, such that the protrusions of the secondary support members can be releasably secured within the recesses of the faceplates to releasably secure support the support members in the primary frame of the faceplate.

14. The modular faceplate system of claim 8, further comprising fastening means integrally formed on at least one module and complementary fastening means integrally formed on at least one secondary support member proximate a secondary frame opening, the fastening means formed on the module directly contacting and cooperating with the fastening means formed proximate the secondary frame opening so as to releasably secure the module within the secondary frame opening.

15. The modular faceplate system of claim 13, further comprising fastening means integrally formed on at least one module and complementary fastening means integrally formed on at least one secondary support member proximate a secondary frame opening, the fastening means formed on the module directly contacting and cooperating with the fastening means formed proximate the secondary frame opening so as to releasably secure the module within the secondary frame opening.

16. The modular faceplate system of claim 15, wherein the fastening means integrally formed on the module comprises a protrusion and the fastening means integrally formed on the secondary support member comprises a recess which is complementary to the protrusion formed on the modules such that the protrusion can be releasably secured within the recess so as to releasably secure the module within the second frame opening.

* * * * *